United States Patent
Higashira

(10) Patent No.: US 10,030,163 B2
(45) Date of Patent: Jul. 24, 2018

(54) COATING AGENT AQUEOUS DISPERSION

(71) Applicant: NOK CORPORATION, Tokyo (JP)

(72) Inventor: Toshihiro Higashira, Kanagawa (JP)

(73) Assignee: NOK Corporation, Tokyo (JP)

(*) Notice: Subject to any disclaimer, the term of this patent is extended or adjusted under 35 U.S.C. 154(b) by 0 days.

(21) Appl. No.: 15/514,828

(22) PCT Filed: Oct. 1, 2015

(86) PCT No.: PCT/JP2015/077942
§ 371 (c)(1),
(2) Date: Mar. 28, 2017

(87) PCT Pub. No.: WO2016/052702
PCT Pub. Date: Apr. 7, 2016

(65) Prior Publication Data
US 2017/0210934 A1 Jul. 27, 2017

(30) Foreign Application Priority Data

Oct. 1, 2014 (JP) ................................. 2014-203204

(51) Int. Cl.
C09D 133/00 (2006.01)
C09D 127/18 (2006.01)
C09D 133/06 (2006.01)
C09D 131/04 (2006.01)

(52) U.S. Cl.
CPC .......... C09D 133/06 (2013.01); C09D 127/18 (2013.01); C09D 131/04 (2013.01)

(58) Field of Classification Search
CPC .......................... C09D 123/0853; C09D 127/18
See application file for complete search history.

(56) References Cited

U.S. PATENT DOCUMENTS

| | | | |
|---|---|---|---|
| 6,921,787 B2 | 7/2005 | Bate | |
| 2004/0167263 A1 | 8/2004 | Bate | |
| 2005/0233152 A1 | 10/2005 | Bate | |
| 2011/0213069 A1 | 9/2011 | Kanazawa et al. | |
| 2015/0252181 A1* | 9/2015 | Higashira | ............ C09D 109/02 428/422 |

FOREIGN PATENT DOCUMENTS

| | | |
|---|---|---|
| JP | 48-68559 | 12/1946 |
| JP | A 60-226509 | 11/1985 |
| JP | A 61-069880 | 4/1986 |
| JP | 61-171776 | 8/1986 |
| JP | 02-138380 | 5/1990 |
| JP | 04-329213 | 11/1992 |
| JP | 2006-511674 A | 4/2006 |
| JP | 2006-117900 A | 5/2006 |
| JP | 2007-191709 | 8/2007 |
| JP | 2010-106222 A | 5/2010 |
| WO | WO 2004/050774 A2 | 6/2004 |
| WO | WO 2004/050774 A3 | 6/2004 |
| WO | WO 2006/035726 A1 | 4/2006 |
| WO | WO 2014/050722 A1 | 4/2014 |

OTHER PUBLICATIONS

International Search Report from corresponding PCT application No. PCT/JP2015/077942 dated Dec. 8, 2015 (4 pgs).
Suwa, Takeshi et al, "Melting and Crystallization Behavior of Poly(tetrafluoroethylene). New Method for Molecular Weight Measurement of Poly(tetrafluoroethylene) Using a Differential Scanning Calorimeter", *Journal of Applied Polymer Science*, vol. 17, No. 11, pp. 3253-3257 (Nov. 1973).
International Preliminary Report on Patentability and Written Opinion from Corresponding PCT application No. PCT/JP2015/077942 dated Apr. 13, 2017 (10pgs).

* cited by examiner

*Primary Examiner* — Vu A Nguyen
(74) *Attorney, Agent, or Firm* — Brinks Gilson & Lione

(57) ABSTRACT

A coating agent aqueous dispersion comprising, as solid matters, 20 to 80 wt. %, preferably 29 to 70 wt. %, of PTFE, 10 to 50 wt. %, preferably 14 to 36 wt. %, of acrylic resin, and 10 to 50 wt. %, preferably 20 to 45 wt. %, of ethylene-vinyl acetate copolymer resin. When the coating agent aqueous dispersion of the present invention is used as a surface-treating agent for rubber-made sealing materials, etc., a reduction in stickiness to the sealing mate material and the prevention of blooming on the surface of the rubber material are obtained. Combined with the flexibility, the adhesion balance between the rubber material and the coating agent is excellent.

12 Claims, No Drawings

US 10,030,163 B2

COATING AGENT AQUEOUS DISPERSION

RELATED APPLICATION

This application is a 35 U.S.C. § 371 national phase filing of International Patent Application No. PCT/JP2015/077942, filed Oct. 1, 2015, through which and to which priority is claimed under 35 U.S.C. § 119 to Japanese Patent Application No. 2014-203204, filed Oct. 1, 2014, the entire disclosure of which is hereby expressly incorporated by reference.

TECHNICAL FIELD

The present invention relates to a coating agent aqueous dispersion. More particularly, the present invention relates to a coating agent aqueous dispersion that is effectively used, for example, as a surface-treating agent for rubber-made sealing materials.

BACKGROUND ART

Various products are used as coating agent aqueous dispersions for use in surface-treating agents for rubber-made sealing materials. For example, Patent Document 1 discloses a PTFE (polytetrafluoroethylene resin) aqueous dispersion composition comprising PTFE particles and a polyoxyalkylene alkyl ether-based compound, and optionally containing a film formation improver, such as an acrylic resin, a surfactant, or the like. Patent Document 1 indicates that this composition has a significantly high crack threshold thickness, and that a thickened film can be obtained even by one impregnation or coating of the composition. A flexibility evaluation, an adhesion evaluation, etc., among later-described various tests are satisfactory; however, an adhesion reduction evaluation by a humidification test is not satisfactory.

Patent Document 2 discloses a coating composition comprising perfluorocarbon polymer fine particles, mica or metal flakes, (meth)acrylic-based polymer, and a liquid carrier. This composition is mainly used for PTFE-coated cookware. Among later-described various tests, an adhesion evaluation is satisfactory; however, a flexibility evaluation and an adhesion reduction evaluation by a humidification test are not satisfactory.

Patent Document 3 discloses an aqueous coating agent composition comprising an ethylene-vinyl acetate copolymer resin emulsion and two or more types of PTFE resin powders having different particle diameters. Patent Document 3 indicates that this composition has excellent coating film adhesion, workability, heat resistance, and chemical resistance. Among later-described various tests, a flexibility evaluation and an adhesion reduction evaluation by a humidification test are satisfactory; however, an adhesion evaluation is not satisfactory.

Patent Document 4 discloses a non-stick coating containing fluoropolymer, acrylic polymer, and polyol or diol. Further, Patent Document 5 discloses an aqueous dispersion composition for coating fluororesin comprising a fluororesin particle dispersion and a depolymerizable acrylic resin particle emulsion.

However, because these compositions are sintered at 300° C. or higher, rubber deterioration occurs in fluororubber and silicone rubber, and rubber materials with low heat resistance, such as NBR, are significantly deteriorated. Accordingly, these compositions cannot be applied to seal parts.

PRIOR ART DOCUMENTS

Patent Documents

Patent Document 1: JP-A-2006-117900
Patent Document 2: JP-A-48-68559
Patent Document 3: JP-A-2010-106222
Patent Document 4: JP-A-2006-511674
Patent Document 5: JP-A-2007-191709
Patent Document 6: JP-A-61-171776
Patent Document 7: JP-A-2-138380
Patent Document 8: JP-A-60-226509
Patent Document 9: JP-A-61-69880
Non-Patent Document 1: J. Applied Polymer Science, Vol. 17, pp. 3253-7 (1973)

OUTLINE OF THE INVENTION

Problem to be Solved by the Invention

An object of the present invention is to provide a coating agent aqueous dispersion that satisfies various characteristics required for rubber-made sealing materials when the coating agent aqueous dispersion is used for a rubber-made sealing material, etc.

Means for Solving the Problem

The above object of the present invention can be achieved by a coating agent aqueous dispersion comprising, as solid matters, 20 to 80 wt. % of PTFE, 10 to 50 wt. % of acrylic resin, and 10 to 50 wt. % of ethylene-vinyl acetate copolymer resin.

Effect of the Invention

Due to the addition of both an acrylic resin and an ethylene-vinyl acetate copolymer resin as a binder for PTFE particles, the heat curing of the acrylic resin and welding effects to rubber resulting from the melting of the ethylene-vinyl acetate copolymer resin by heat treatment can be obtained. Further, the rubber is not deteriorated because the heat treatment can be performed at about 180° C. or lower in a short period of time.

The addition of both components contributes to a reduction in stickiness to the sealing mate material and the prevention of blooming on the surface of the rubber material. Combined with the flexibility, the adhesion balance between the rubber material and the coating agent is excellent. Although stickiness can be reduced by adding a surfactant or an oil, the adhesion to the rubber material is inevitably reduced. On the contrary, since such low-molecular components are not added in the present invention, the adhesion to the rubber is excellent.

The coating agent aqueous dispersion of the present invention can be effectively applied to various rubber-made sealing materials, such as O rings, oil seals, gaskets, diaphragms, and valves. In addition to these rubber-made sealing materials, the coating agent aqueous dispersion of the present invention can also be used for stickiness prevention, lower friction, abrasion prevention, etc., of various rubber parts.

EMBODIMENTS FOR CARRYING OUT THE INVENTION

The coating agent aqueous dispersion of the present invention comprises, as solid matters, 20 to 80 wt. %, preferably 29 to 70 wt. %, of PTFE, 10 to 50 wt. %, preferably 15 to 40 wt. %, of acrylic resin, and 10 to 50 wt. %, preferably 14 to 36 wt. %, of ethylene-vinyl acetate copolymer resin. The total amount of these components is 100 wt. %. The coating agent aqueous dispersion can be obtained as an aqueous dispersion by dispersing these three components at the same time; however, it is preferable that the coating agent aqueous dispersion is prepared as a mixture of a PTFE aqueous dispersion, an acrylic resin aqueous dispersion, and an ethylene-vinyl acetate copolymer resin aqueous dispersion, each of which is commercially available.

The PTFE aqueous dispersion is used for the purpose of lowering the friction, reducing stickiness to the sealing mate material, decreasing the flexibility, preventing blooming on the surface of the rubber material, and hardly allowing stickiness to occur due to contact during coating. These characteristics are developed because PTFE is in the form of fine particles, and has non-stickiness and low friction characteristics. In addition, the molecular weight of PTFE is large, and their particles are small; therefore, blooming on the surface of the rubber material is blocked or delayed.

Examples of PTFE include not only a homopolymer of tetrafluoroethylene, but also polymer products obtained by copolymerizing this homopolymer with a small amount of perfluorovinyl ether, hexafluoropropylene, ethylene, or the like. The number average molecular weight Mn of PTFE is preferably $2\times10^4$ to $1\times10^7$, particularly preferably $2\times10^5$ to $8\times10^6$. If Mn is smaller than this range, the coating film tends to be fragile. If Mn is greater than this range, the melt viscosity is overly high, and the particles tend to be hardly fused with each other. Mn can be determined by the method described in Non-Patent Document 1.

Moreover, the average particle diameter of the PTFE aqueous dispersion is preferably about 200 to 500 nm, particularly preferably about 200 to 400 nm. If the average particle diameter is smaller than about 200 nm, the particles easily aggregate with each other, and roughness is formed on the coating surface. If the average particle diameter is greater than about 500 nm, the particles are easily precipitated, and the stability of the aqueous dispersion composition is reduced. If the proportion of PTFE in the total solid matter is less than about 20 wt. %, the frictional coefficient increases, and stickiness tends to occur. Further, blooming on the surface of the rubber material cannot be blocked. In contrast, if the proportion of PTFE is greater than about 80 wt. %, the adhesion to rubber and the flexibility decrease. Further, aggregates of the PTFE particles are formed on the surface of the coating film, thereby increasing the surface roughness, and deteriorating the sealing properties; in addition, the aggregates are removed to become contaminants.

The acrylic resin aqueous dispersion is used for the purpose of lowering the friction, reducing stickiness to the sealing mate material, decreasing the flexibility, and preventing blooming on the surface of the rubber material. The acrylic resin aqueous dispersion is cured with heat.

The acrylic resin used is a homopolymer or copolymer of (meth)acrylic acid alkyl ester represented by the general formula $CH_2=CRCOOR'$ (R: a hydrogen atom or a methyl group, preferably a methyl group; R': a $C_1$-$C_{16}$, preferably $C_2$-$C_{12}$, linear or branched alkyl group), wherein the glass transition temperature Tg of the homopolymer is $-20°$ C. or lower. The lower Tg is, stickiness is lost, the hardness is higher, and the friction is lower. On the contrary, if the higher Tg is, the strength is lower, stickiness occurs, and the frictional coefficient is higher.

General examples of the (meth)acrylic acid alkyl ester, preferably methacrylic acid alkyl ester, represented by the above general formula include those containing an alkyl group having 1 to 16 carbon atoms, preferably 2 to 12 carbon atoms, such as methyl, ethyl, propyl, butyl, isobutyl, pentyl, dimethylpropyl, n-hexyl, n-octyl, isooctyl, 2-ethylhexyl, isononyl, n-decyl, n-dodecyl, and the like.

Examples of the acrylic resin aqueous dispersion include those described in Patent Documents 6 and 7, but are not limited thereto. If the proportion of the acrylic resin in the total solid matter is less than about 10 wt. %, the frictional coefficient increases, and stickiness tends to occur. In contrast, if the proportion of the acrylic resin is greater than 50 wt. %, the adhesion to rubber and the flexibility are degraded.

As described above, if the proportion of PTFE is high, PTFE aggregates are formed on the coating surface, thereby increasing the surface roughness, and deteriorating the sealing properties, and the aggregates are removed to become contaminants; whereas if the proportion of PTFE is low, non-sticky characteristics and low-friction characteristics are impaired. These problems of PTFE can be overcome by compounding an acrylic resin in place of part of PTFE.

Examples of the ethylene-vinyl acetate copolymer resin aqueous dispersion include those described in Patent Documents 8 and 9, but are not limited thereto. The ethylene-vinyl acetate copolymer resin is sticky and soft, and therefore raises the frictional coefficient and increases the stickiness to the sealing mate material; however, the ethylene-vinyl acetate copolymer resin improves the flexibility and increases the adhesion to rubber.

If the ethylene-vinyl acetate copolymer resin is used in an amount of less than 10 wt. % in the total solid matter, the flexibility and the adhesion to rubber are reduced. In contrast, if the ethylene-vinyl acetate copolymer resin is used in an amount of greater than 50 wt. %, the frictional coefficient increases, and stickiness is likely to occur; in addition, when the substrates are brought into contact with each other during coating, stickiness is also likely to occur.

The coating method of the coating agent comprising a mixture of the above three types of aqueous dispersions is not particularly limited. For example, the coating is performed by a dipping method, a spray method, a roll coating method, a doctor blade method, a flow coating method, or the like. Drying after coating is performed at room temperature to about 100° C. for about 5 to 20 minutes. Sintering of the coating agent is performed at about 120 to 230° C., preferably about 180° C. or lower, which is lower than the melting temperature of PTFE, for about 5 to 120 minutes, depending on the type of rubber used, thereby forming a coating film having a film thickness of about 5 to 10 μm thereon.

As the rubber that constitutes the sealing material, not only NBR with low heat resistance but also hydrogenated NBR, acrylic rubber, fluororubber, and the like are used. The coating agent aqueous dispersion of the present invention can be effectively applied to these rubber-made sealing materials.

EXAMPLES

The following describes the present invention with reference to Examples.

Example 1

An NBR composition having the following formulation was subjected to press vulcanization at 180° C. for 6 minutes.

| | |
|---|---|
| NBR (JSR N220S, produced by JSR) | 100 parts by weight |
| Carbon black (HTC#S-S, produced by NSCC Carbon Co., Ltd.) | 40 parts by weight |
| Zinc white (Zinc white No. 3 produced by Seido Chemical Industry Co., Ltd.) | 5 parts by weight |
| Stearic acid (produced by Miyoshi Oil & Fat Co., Ltd.) | 3 parts by weight |
| Antioxidant (Suntight R, produced by Seiko Chemical Co., Ltd.) | 4 parts by weight |
| Antioxidant (Robo 6C, produced by Ouchi Shinko Chemical Industrial Co., Ltd.) | 3 parts by weight |
| Plasticizer (RS-107, produced by ADEKA) | 15 parts by weight |
| Sulfur (produced by Hosoi Chemical Industry Co., Ltd.) | 1.2 parts by weight |
| Vulcanization accelerator (Nocceler TT, produced by Ouchi Shinko Chemical Industrial Co., Ltd.) | 2 parts by weight |
| Vulcanization accelerator (Nocceler CZ, produced by Ouchi Shinko Chemical Industrial Co., Ltd.) | 2.5 parts by weight |

After a sheet (thickness: 2 mm) or O ring was molded, the surface thereof was wiped with Kimwipes wetted with methyl ethyl ketone. The coating agent was applied thereto by spraying to a film thickness of 5 to 10 μm, followed by heat treatment at 140° C. for 30 minutes.

The coating agent used was a mixture of 52 parts by weight (59 wt. % as solid matters) of a PTFE aqueous dispersion (Polyflon Dispersion D-1E, produced by Daikin Industries, Ltd.; solid matters content: 61 wt. %, average particle diameter: 220 nm), 23 parts by weight (19.5 wt. % as solid matters) of an acrylic resin aqueous dispersion (Nikasol FX-329, produced by Nippon Carbide Industries Co., Inc.; solid maters content: 45 wt. %), and 25 parts by weight (21.7 wt. % as solid matters) of an ethylene-vinyl acetate copolymer resin aqueous dispersion (Nikasol RX-66E, produced by Nippon Carbide Industries Co., Inc.; solid matters content: 46 wt. %).

The heat-treated sheet or O ring was subjected to measurement or evaluation for the following items.

Friction Coefficient:

Measured according to ASTM D-1894, JIS K7125, JIS P8147, ISO 8295

Using a surface property tester Heidon Tribogear (produced by Shinto Scientific Co., Ltd.), the dynamic friction coefficient of the coated rubber sheet surface was measured.

(Test Conditions)

Mating material: SUS304 steel ball having a diameter of 10 mm

Moving rate: 50 mm/min

Load: 0.49 N

Amplitude: 50 mm

Evaluation of Flexibility of Coating Agent by Bending Test:

The coated rubber sheet was bent around a mandrel having a diameter of 6 mm, and an adhesive tape was attached to the bent portion. Then, whether or not the coating agent was peeled off was evaluated.

(Evaluation)

○: The coating agent on the bent portion was not peeled off, and was not transferred to the tape X: The coating agent on the bent portion was peeled off, and was transferred to the tape Evaluation of Adhesion by Adhesion Test:

The coated rubber sheet was punched into a disk having a diameter of 13 mm, and sandwiched between the following two mate materials:

Mate material: SUS430

Compression ratio: 33.3%

The resulting product was heated at 80° C. for 60 minutes, and then allowed to stand at room temperature for 1 hour.

Then, the product was released from the compression mold, and the transfer state of the coating agent due to the adhesion of the coating agent to the SUS430 mate materials was evaluated.

(Evaluation)

○: The coating agent was not transferred

Δ: Part of the coating agent was transferred

X: The coating agent was transferred to the entire compressed surface of the mate materials after mold release Evaluation of Reduction in Adhesion to Rubber Caused by Blooming from Rubber by Humidification Test:

The coated rubber sheet was subjected to a heating test at 50° C. at 90% RH for 15 hours, and a tape peeling test was repeated 5 times. Whether or not the coating agent was peeled off due to blooming from the rubber was evaluated by a humidification test.

(Evaluation)

○: The coating agent was not peeled off

Δ: The coating agent was gradually peeled off for every peeling test until 5 tape peeling tests were conducted X: The coating agent was peeled off with one tape peeling test Evaluation of Bleeding:

The coated rubber sheet was subjected to a heat test at 70° C. for 30 days. Whether or not any bloom component from the rubber was deposited on the coating surface was evaluated.

(Evaluation)

○: No deposition of solids on the surface was visually observed

X: Deposition of solids on the surface was visually observed

Evaluation of Conveyance Properties of O Ring by Parts Feeder:

The coated O ring (inner diameter: 7.8 mm, thickness: 1.9 mm in diameter, nominal number: JIS B2401-4 type DP8) was used for the evaluation of the conveyance properties of the O ring by a parts feeder.

(Evaluation)

○: The conveying speed was higher than that of silicone oil-applied O rings without coating treatment X: The conveying speed was equal to that of silicone oil-applied O rings without coating treatment Note: When uncoated rubber to which silicone oil has been applied is conveyed, the stickiness of the silicone oil causes a slow conveying speed, and the blocked O rings remain on the parts feeder.

Occurring no stickiness and the lower the friction coefficient is, the higher the conveying speed is.

O Ring Leak Test:

The coated O ring (inner diameter: 119.6 mm, thickness: 7 mm in diameter; nominal number: P120) was compressed 5%. Helium gas was introduced, and the helium leaked amount at the time of 3 minutes after the introduction was measured using a helium leak detector.

(Evaluation)

○: Low leak

X: High leak

Example 2

In Example 1, the amount of the PTFE aqueous dispersion was changed to 24 parts by weight (29.7 wt. % as solid matters), that of the acrylic resin aqueous dispersion was changed to 38 parts by weight (34.8 wt. % as solid matters), and that of the ethylene-vinyl acetate copolymer resin aqueous dispersion was changed to 38 parts by weight (35.6 wt. % as solid matters), respectively.

Example 3

In Example 1, the amount of the PTFE aqueous dispersion was changed to 38 parts by weight (45.25 wt. % as solid matters), that of the acrylic resin aqueous dispersion was changed to 45 parts by weight (39.5 wt. % as solid matters), and that of the ethylene-vinyl acetate copolymer resin aqueous dispersion was changed to 17 parts by weight (15.25 wt. % as solid matters), respectively.

Comparative Example 1

In Example 1, the PTFE aqueous dispersion was not used, the amount of the acrylic resin aqueous dispersion was changed to 51 parts by weight (50 wt. % as solid matters), and that of the ethylene-vinyl acetate copolymer resin aqueous dispersion was changed to 49 parts by weight (50 wt. % as solid matters), respectively.

Comparative Example 2

In Example 1, the acrylic resin aqueous dispersion was not used, the amount of the PTFE aqueous dispersion was changed to 43 parts by weight (50 wt. % as solid matters), and that of the ethylene-vinyl acetate copolymer resin aqueous dispersion was changed to 57 parts by weight (50 wt. % as solid matters), respectively.

Comparative Example 3

In Example 1, the ethylene-vinyl acetate copolymer resin aqueous dispersion was not used, the amount of the PTFE aqueous dispersion was changed to 42 parts by weight (49.5 wt. % as solid matters), and that of the acrylic resin aqueous dispersion was changed to 58 parts by weight (50.5 wt. % as solid matters), respectively.

Comparative Example 4

In Example 1, the amount of the PTFE aqueous dispersion was changed to 8 parts by weight (10.4 wt. % as solid matters), that of the acrylic resin aqueous dispersion was changed to 41 parts by weight (39.4 wt. % as solid matters), and that of the ethylene-vinyl acetate copolymer resin aqueous dispersion was changed to 51 parts by weight (50.1 wt. % as solid matters), respectively.

Comparative Example 5

In Example 1, the amount of the PTFE aqueous dispersion was changed to 87 parts by weight (90 wt. % as solid matters), that of the acrylic resin aqueous dispersion was changed to 7 parts by weight (5.3 wt. % as solid matters), and that of the ethylene-vinyl acetate copolymer resin aqueous dispersion was changed to 6 parts by weight (4.6 wt. % as solid matters).

Results of measurement or evaluation obtained in the foregoing Examples and Comparative Examples are shown in the following Table.

TABLE

| Measurement evaluation item | Example | | | Comparative Example | | | | |
|---|---|---|---|---|---|---|---|---|
| | 1 | 2 | 3 | 1 | 2 | 3 | 4 | 5 |
| Friction coefficient | 0.5 | 0.7 | 0.6 | >1.5 | 1.0 | 0.6 | 0.9 | 0.3 |
| Evaluation of flexibility | ○ | ○ | ○ | ○ | ○ | X | ○ | X |
| Evaluation of adhesion | ○ | Δ | ○ | X | X | X | X | ○ |
| Evaluation of reduction in adhesion | ○ | ○ | Δ | ○ | ○ | X | Δ | X |
| Evaluation of bleeding | ○ | ○ | ○ | X | ○ | ○ | X | ○ |
| Evaluation of conveyance properties | ○ | ○ | ○ | X | X | ○ | X | ○ |
| O ring leak test | ○ | ○ | ○ | ○ | ○ | X | ○ | X |

The invention claimed is:

1. A coating agent aqueous dispersion comprising, as solid matters, 20 to 59.2 wt. % of PTFE, 19.3 to 50 wt. % of acrylic resin, and 21.5 to 50 wt. % of ethylene-vinyl acetate copolymer resin.

2. The coating agent aqueous dispersion according to claim 1, which comprises, as solid matters, 29 to 59.2 wt. % of PTFE, 19.3 to 40 wt. % of acrylic resin, and 21.5 to 36 wt. % of ethylene-vinyl acetate copolymer resin.

3. The coating agent aqueous dispersion according to claim 1, which comprises a mixture of a PTFE aqueous dispersion, an acrylic resin aqueous dispersion, and an ethylene-vinyl acetate copolymer resin aqueous dispersion.

4. The coating agent aqueous dispersion according to claim 3, wherein the PTFE aqueous dispersion has an average particle diameter of 200 to 500 nm.

5. A method of surface-treating a rubber-made sealing material which comprises applying the coating agent aqueous dispersion according to claim 1 to a surface of the rubber-made sealing material.

6. A rubber-made sealing material, which is surface-treated with the coating agent aqueous dispersion according to claim 1.

7. The rubber-made sealing material according to claim 6, which is an NBR-made sealing material.

8. The coating agent aqueous dispersion according to claim 2, which comprises a mixture of a PTFE aqueous dispersion, an acrylic resin aqueous dispersion, and an ethylene-vinyl acetate copolymer resin aqueous dispersion.

9. The coating agent aqueous dispersion according to claim 8, wherein the PTFE aqueous dispersion has an average particle diameter of 200 to 500 nm.

10. A method of surface-treating a rubber-made sealing material which comprises applying the coating agent aqueous dispersion according to claim 2 to a surface of the rubber-made sealing material.

11. A rubber-made sealing material, which is surface-treated with the coating agent aqueous dispersion according to claim 2.

12. The rubber-made sealing material according to claim 11, which is an NBR-made sealing material.

* * * * *